Patented Oct. 17, 1922.

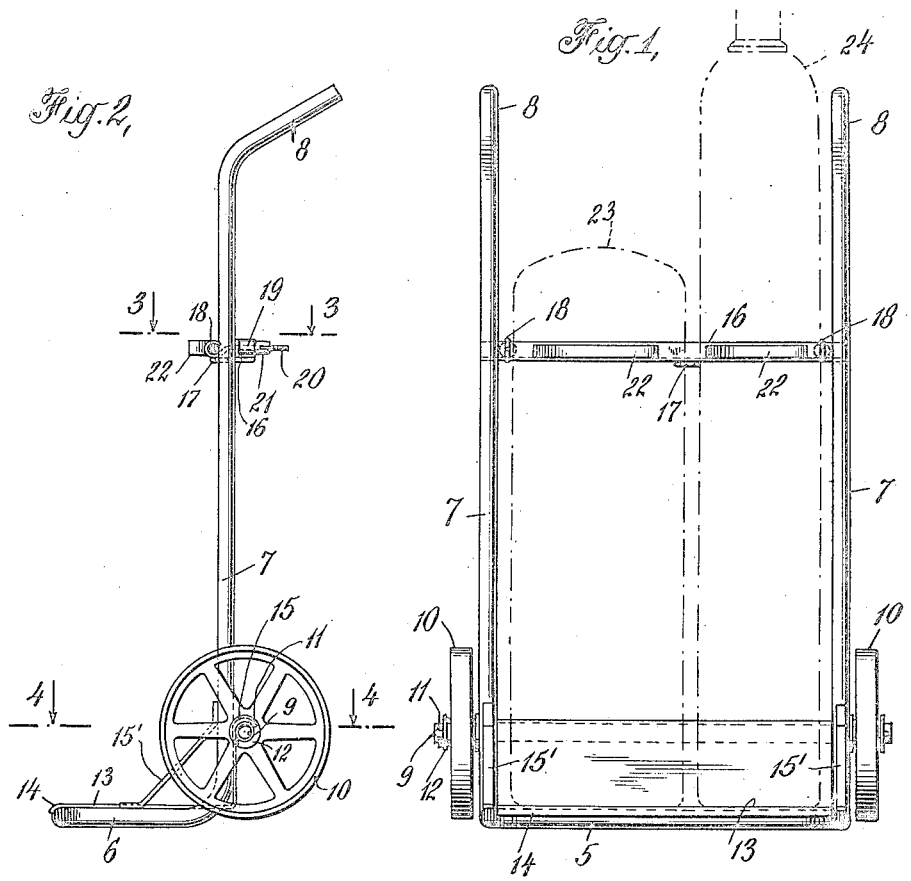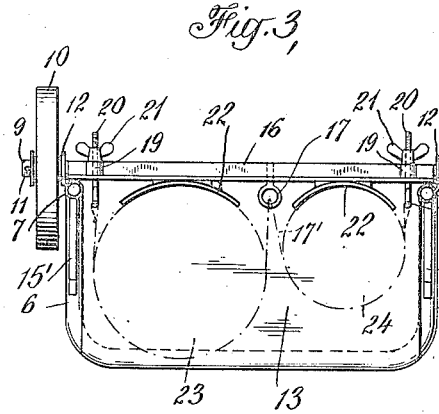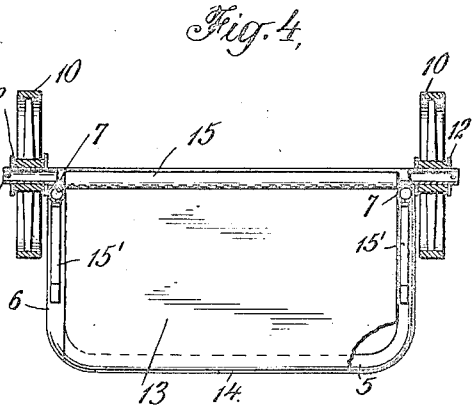

1,432,037

UNITED STATES PATENT OFFICE.

RICHARD F. RUSSELL, OF JERSEY CITY, NEW JERSEY, ASSIGNOR TO AIR REDUCTION COMPANY, INC., A CORPORATION OF NEW YORK.

TRUCK.

Application filed May 2, 1919. Serial No. 294,238.

*To all whom it may concern:*

Be it known that I, RICHARD F. RUSSELL, a citizen of the United States, residing at Jersey City, in the county of Essex, State of New Jersey, have invented certain new and useful Improvements in Trucks; and I do hereby declare the following to be a full, clear, and exact description of the invention, such as will enable others skilled in the art to which it appertains to make and use the same.

This invention relates to trucks of the kind employed for transporting heavy merchandise in warehouses, factories and the like and has particular reference to a truck adapted to support the cylinders or "bottles" of an oxy-acetylene welding or cutting outfit.

The object of the invention is to provide a relatively inexpensive, rigid and dependable truck adapted to withstand rough usage successfully and to provide an oxy-acetylene welding or cutting outfit which may be readily moved from place to place.

Further objects and advantages of the invention will be apparent as it is better understood by reference to the following specification when read in connection with the accompanying drawing illustrating the preferred embodiment thereof, in which, Fig. 1 is a front elevation of a truck embodying my invention;

Fig. 2 is a side elevation thereof;

Fig. 3 is a section on the line 3—3 of Fig. 2; and

Fig. 4 is a section on the line 4—4 of Fig. 2.

While my invention is particularly designed for use in connection with oxy-acetylene welding and cutting apparatus, it is to be understood that the improved truck as hereinafter described is not necessarily limited to such use but may be successfully employed for handling merchandise of any character by omitting details of construction specifically provided to facilitate the handling of gas containing bottles. In describing my invention, therefore, with reference to the bottles which are mounted on the truck, it should be appreciated that it is not my intention to limit the invention to the exact details described and illustrated in the drawing.

In the practice of oxy-acetylene welding and cutting, it is frequently desirable to provide for easy transportation of the necessary oxygen and acetylene bottles about the factory, yard or other place where the work is to be performed. The bottles are quite heavy and are unwieldy in shape. It has been previously suggested to mount the bottles upon a truck so that they may be transported as a unit and various forms of trucks have been devised for this purpose. Usually the trucks are constructed of angle iron and comprise a considerable number of parts riveted or otherwise fastened together. The hard usage to which such devices are subjected causes a rapid deterioration of the truck so that it must be replaced at frequent intervals.

It is the purpose of my invention to provide a rigid and substantial truck capable of continued use without the necessity of repair or replacement of its parts. I have discovered that a satisfactory truck may be constructed of standard wrought iron pipe bent to provide in a single piece, the platform support and handles of the truck. Another and shorter pipe provides the axle although obviously a solid axle may be substituted. The platform is preferably constructed of sheet metal and is hung upon the axle and the transverse member of the platform support, and the two arms are connected by a cross bar of angle iron secured thereto and providing a rest for the bottles when mounted on the truck. Wrought iron is mentioned as the material best adapted and most readily available for the purpose. Obviously, however, the particular metal employed is immaterial to the substance of the invention.

Referring to the drawing, the pipe is bent to provide a transverse platform support 5, end bars 6 and arms 7 having handles 8 at their upper ends whereby the truck is grasped by the operator when in use. The axle 9 is welded to the arm 7 at a point sufficiently distant from the end bars 6 to permit the use of wheels 10 of the desired size. The wheels are mounted on the ends of the axle 9 and are held thereon by cotter pins 11, suitable washers 12 being provided to prevent interference of the wheels with the arms 7 and with the cotter pins 11.

The platform 13 is constructed of sheet metal bent to an L shape with curved ends 14 and 15, the former being adapted to engage the platform support 5 and the latter being adapted to hang on the axle 9. The ends of the platform are welded to the platform support 5 and axle 9 and angular braces 15' are welded to the platform support to strengthen the structure and to prevent interference of merchandise on the platform with the wheels 10.

A transverse bar 16, preferably of angle iron is welded to the arms 7 to provide a rest for the bottles when mounted on the truck. An eye-bolt 17 is welded to the cross bar 16 midway of its length to support the ends of chains 17' adapted to embrace the bottles and to engage hooks 18 loosely supported in blocks 19 which are welded to the cross bar and are provided with openings to receive the shanks of the hooks. The shanks of the hooks are threaded as indicated at 20 to receive wing nuts 21 whereby the chains are tightened about the bottles so that they are securely fastened. Preferably cradles 22 are welded to the cross bar 16 to engage the bottles, the cradles having a curvature conforming preferably to that of an acetylene bottle 23 and an oxygen bottle 24.

Thus, as it will be readily understood, the necessary bottles for a welding and cutting outfit may be mounted and secured on the truck and may be readily wheeled from place to place as is necessary in the desired utilization of the contents thereof. The truck is extremely rigid in construction, its principal member being the single length of pipe bent to the required form. All other parts are welded and thus securely fastened to the rigid frame so that the device will successfully withstand the shocks of continued use. Trucks constructed in accordance with my invention may be expected to give long and useful service without deterioration.

Various changes may obviously be made in the form, arrangement and construction of the parts without departing from the spirit of the invention or sacrificing any of its material advantages.

I claim:

1. In a two-wheeled truck, a bent tubular frame providing spaced handles and a transversely disposed platform support formed from one piece, an axle secured to the frame, wheels on the axle, and a sheet metal platform resting at its ends on the axle and platform support.

2. In a two-wheeled truck, a bent tubular frame providing spaced handles and a platform support formed from one piece, an axle secured to the frame, wheels on the axle, and an L-shaped sheet metal platform having its ends bent to embrace the axle and platform support and supported thereby.

3. In a two-wheeled truck, a bent tubular frame providing spaced handles and a platform support formed from one piece, an axle secured to the frame, wheels on the axle, a sheet metal platform resting at its ends on the axle and platform support, a cross-bar rigidly connecting the handles, a pair of cradles on the cross-bar to receive gas bottles supported on the platform, and means for fastening the gas bottles in the cradles.

4. In a two-wheeled truck, a bent tubular frame providing spaced handles and a platform support formed from one piece, an axle secured to the frame, wheels on the axle, a sheet metal platform resting at its ends on the axle and platform support, a cross-bar rigidly connecting the handles, a pair of cradles on the cross-bar to receive gas bottles supported on the platform, and means for fastening the gas bottles in the cradles, said means being adjustable to bottles of varying diameters.

In testimony whereof I affix my signature.

RICHARD F. RUSSELL.